United States Patent
Mantovan et al.

(10) Patent No.: US 9,358,632 B2
(45) Date of Patent: Jun. 7, 2016

(54) WELD SPLATTER CONTAINMENT DEVICE FOR USE IN ROLLING MILLS

(75) Inventors: Gianfranco Mantovan, Busto Arsizio (IT); Teresio Colombo, Vanzaghello (IT); Roberto Bianchi, Milan (IT)

(73) Assignee: Primetals Technologies Italy S.R.L., Marnate VA (IT)

( * ) Notice: Subject to any disclaimer, the term of this patent is extended or adjusted under 35 U.S.C. 154(b) by 819 days.

(21) Appl. No.: 12/445,078

(22) PCT Filed: Oct. 5, 2007

(86) PCT No.: PCT/IB2007/003120
§ 371 (c)(1),
(2), (4) Date: May 20, 2009

(87) PCT Pub. No.: WO2008/044140
PCT Pub. Date: Apr. 17, 2008

(65) Prior Publication Data
US 2010/0072185 A1   Mar. 25, 2010

(30) Foreign Application Priority Data
Oct. 10, 2006  (IT) .............. MI06A001942

(51) Int. Cl.
*B23K 11/00*   (2006.01)
*B23K 11/04*   (2006.01)
*B23K 37/00*   (2006.01)

(52) U.S. Cl.
CPC ............. *B23K 11/04* (2013.01); *B23K 11/0073* (2013.01); *B23K 37/00* (2013.01)

(58) Field of Classification Search
CPC .. B23K 11/002; B23K 11/0073; B23K 11/04; B23K 37/00–37/006; B23K 37/06
USPC ............ 219/97–100, 148, 161; 269/3, 6, 909; 29/270, 278
See application file for complete search history.

(56) References Cited

U.S. PATENT DOCUMENTS

| | | | | |
|---|---|---|---|---|
| 2,243,086 A | * | 5/1941 | Buettell | 219/236 |
| 3,668,363 A | * | 6/1972 | Ehrlich | 219/98 |
| 3,938,797 A | * | 2/1976 | Frederick | 269/20 |
| 4,468,553 A | * | 8/1984 | Brastow et al. | 219/51 |
| 4,518,841 A | * | 5/1985 | de Bentzmann | 219/56 |
| 5,124,520 A | * | 6/1992 | Spendlove | 219/50 |
| 5,591,358 A | * | 1/1997 | Quagline | 219/121.63 |
| 5,990,442 A | * | 11/1999 | Suita et al. | 219/86.25 |

FOREIGN PATENT DOCUMENTS

| | | | |
|---|---|---|---|
| EP | 528667 A1 | * | 2/1993 |
| GB | 2067259 A | * | 7/1981 |

(Continued)

*Primary Examiner* — Sang Y Paik
(74) *Attorney, Agent, or Firm* — Laurence A. Greenberg; Werner H. Stemer; Ralph E. Locher

(57) ABSTRACT

A weld splatter containment device for use in rolling mills includes a lower cover and an upper cover, both controllable in approaching and moving away from a welding zone so as to substantially surround the welding zone when the lower and upper covers are situated in a position close to the welding zone. The lower cover is controlled in approaching and moving away from the welding zone along a first circular trajectory portion and the upper cover is controlled in approaching and moving away from the welding zone along a second circular trajectory portion.

14 Claims, 7 Drawing Sheets

(56) References Cited

FOREIGN PATENT DOCUMENTS

| JP | 2003236678 | A | * | 8/2003 |
|---|---|---|---|---|
| SU | 1673343 | A1 | | 8/1991 |
| SU | 1719174 | A1 | | 3/1992 |
| SU | 1780959 | A1 | | 12/1992 |

* cited by examiner

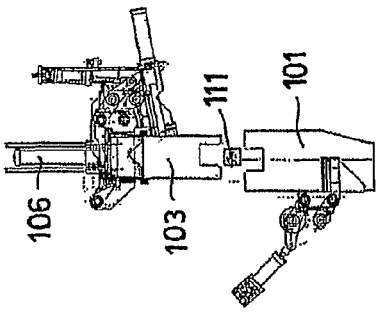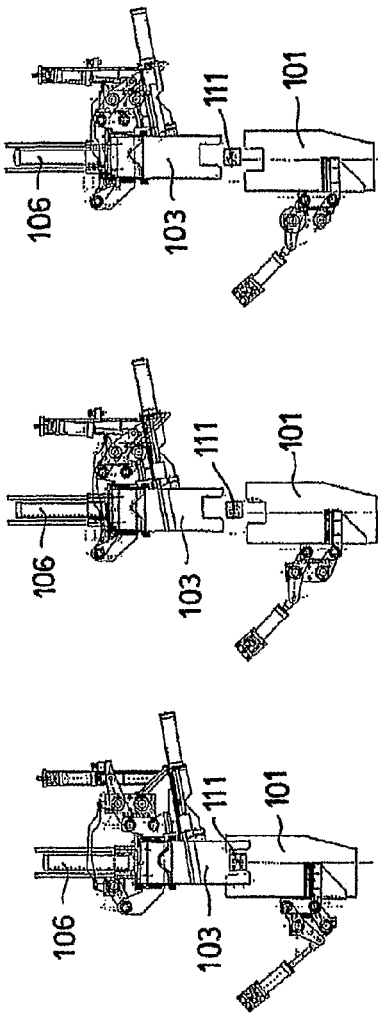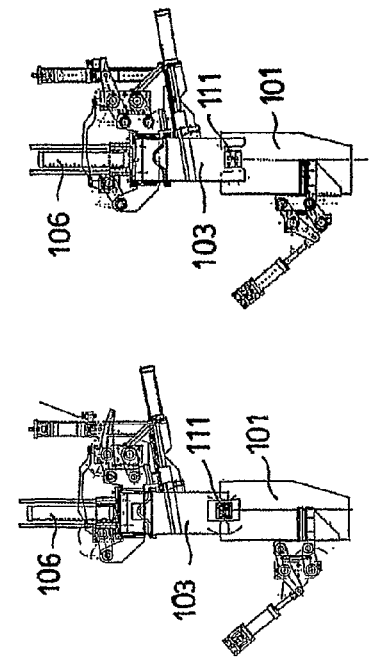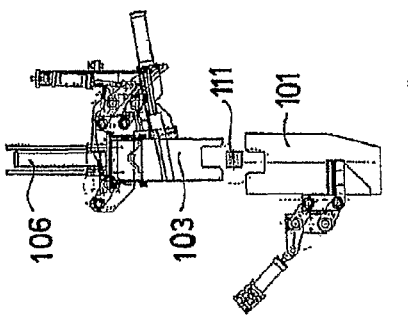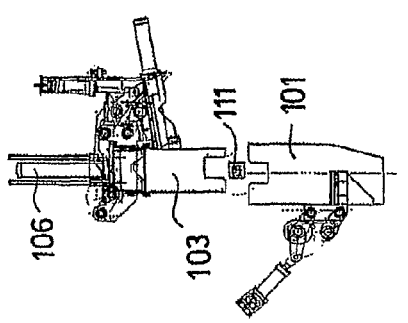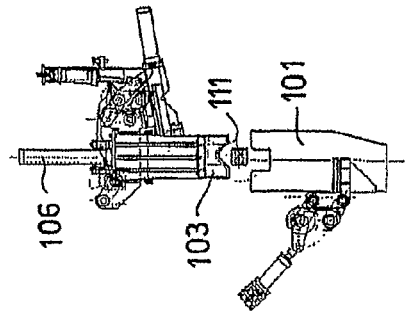

WELD SPLATTER CONTAINMENT DEVICE FOR USE IN ROLLING MILLS

BACKGROUND OF THE INVENTION

Field of the Invention

The present invention refers to a weld splatter containment device for use in rolling mills.

In the process of rolling long products, the rolling of the product with the final form and size occurs by starting from a casting product, called billet, with square or round section of dimensions equal to about 120-200 mm, as well as length in the range of about 8-12 m.

Every billet begins its deformation by being inserted between the rolling stands, which are arranged one after the other so to generate a succession of deformations until the final size and form are attained.

The rolling time lasts about one to two minutes and at every drawing-in the billet head must correctly be inserted in the inlet equipment and then between the rolls of the respective stands, with high stoppage risks.

Moreover, after the passage through four or five stands, a billet head cropping is necessary so that, at the entrance into a stand, the first part of the billet is always hot. Such operation leads to consequent losses of material. In order to reduce the drawbacks set forth above, it is currently known to use a flash welding system on some facilities, such that at the beginning of the rolling, the head of a successive billet is welded with the end of a preceding billet. In such a manner, it is possible to conduct a continuous wire rolling.

The welding machines employed are composed of a fixed structure and a movable structure which respectively come to clasp the end and the head of the billets to be welded. To such end, the two movable and fixed structures are mounted on a car controlled at the same speed as the billets and each have two locking clamps of the billets.

Such movable and fixed structures also present the possibility of varying their relative distance, in order to recover the space left free between the head and the end of the billets, bringing them closer together until they are brought into contact with each other.

The locking clamps, also called electrode holders, bring suitable current intensity in order to achieve the superheating and melting of the two parts in contact with each other.

During the flash phase, the molten steel is splattered far away, and over all parts of the welding machine.

In order for the welding machine to maintain high reliability values offering good functioning parameters, it is necessary to keep it cleaned of the molten steel splatter, in particular for preventing such weld splatter from producing short circuits between the bars which bring the current to the holders and the machine structure.

Maintenance operations are thus necessary, with an unacceptable frequency for a continuous process.

In order to contain this splatter, containment devices are currently employed of the type illustrated in FIGS. 1-3, which surround the welding zone during the flash phase.

Such devices are generally composed of a movable upper cover 11 and a lower cover 12 which can be fixed or movable.

A buffer 13 is installed on the upper cover for cleaning the cover; such buffer 13 is moved by a cylinder 14.

The upper cover 11 and the lower cover 12 of the known device can be moved along the axis A, approaching or moving away from the welding zone. In particular, they are situated at the welding zone (FIG. 1) during the flash phase.

The upper cover 11 can also carry out a rotation, as shown in FIG. 3, in order to reach a tilted, so-called maintenance position in which the mouth of the upper cover 11 is cleaned of the weld splatter.

In addition, for the cleaning of the inner part of the upper cover 11, the buffer 13 can slide inside such cover 11.

Such device, even if offering good protection from the weld splatter, is not capable of attaining satisfactory results.

During the flash phase, considerable space in fact remains between the billets 15 and the covers 11, 12, so that much weld splatter is able to exit outside the covers 11, 12 and become stuck on the welding machine.

Unfortunately, with the known splatter containment devices, it is not possible to reduce such space since if the covers 11,12 came into contact with the billets 15, a short circuit would be created and the electrical current would pass through the covers 11,12 rather than through the surfaces to be welded.

Moreover, the buffer 13 provided in the known devices is not capable of effectively cleaning the inner walls of the upper cover 11 of the welding residues.

The particular tilted conformation of the side walls of the upper cover 11 does not in fact allow the buffer 13 to scrape against the entire inner surface. In particular, the buffer 13 is capable of scraping along the inner side walls of the upper cover 11 only in the lower part thereof.

Moreover, the buffer 13 is not capable of exiting out from the upper cover 11 during its descent.

Therefore, the welding residues at the mouth of the upper cover 11 can be removed only by manually intervening when the upper cover 11 is situated in maintenance position. To such end, however, it is necessary to stop the production of the plant about every two hours.

Finally, the weld splatter during the flash phase is able to reach the buffer 13 and become stuck thereon, compromising its functionality.

BRIEF SUMMARY OF THE INVENTION

The general object of the present invention is that of resolving the abovementioned drawbacks of the prior art in an extremely simple, economical and particularly functional manner.

Further object of the invention is the ideation of a weld splatter containment device which achieves a near total closure of the flash phase zone.

Not the least object of the present invention is that of making a weld splatter containment device which can be automatically cleaned, i.e. without manual interventions, so to not have to stop the production in order to carry out maintenance operations, thus compromising the operating speed of the facility.

In view of the aforesaid objects, according to the present invention, it has been thought to make a weld splatter containment device for use in rolling mills having the characteristics set forth in the attached claims.

The structural and functional characteristics of the present invention and its advantages compared to the prior art will be more evident from an examination of the following description, referred to the attached drawings, which show a weld splatter containment device for use in rolling mills made according to the innovative principles of the invention itself.

BRIEF DESCRIPTION OF THE SEVERAL VIEWS OF THE DRAWING

In the drawings:

FIGS. 6b and 6c are a detail of FIG. 6a;

FIGS. 7a-7h are side views of the splatter containment device in the various operating positions;

DESCRIPTION OF THE INVENTION

Figure 3:
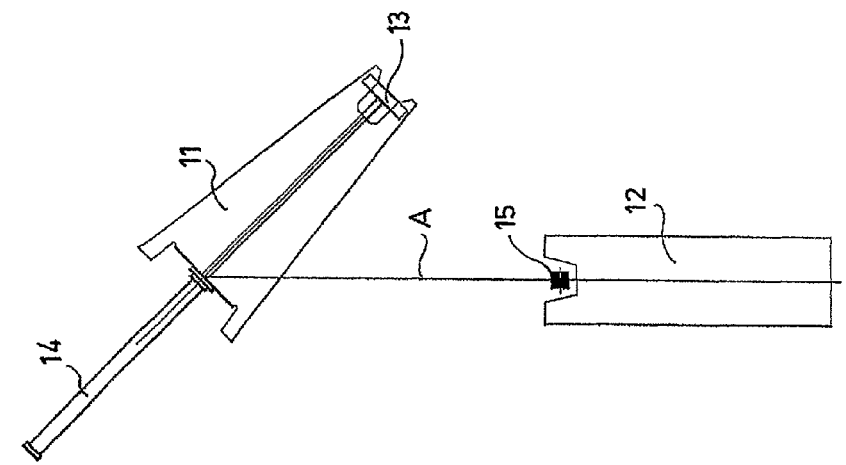
FIGS. 1-3 schematically show a known weld splatter containment device, respectively during the flash phase, during the cleaning phase and during the maintenance phase.
Figure 2:
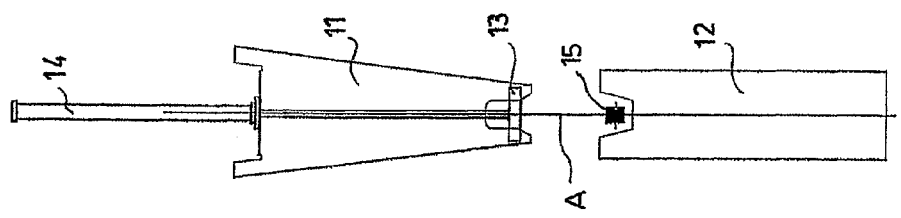
Figure 1:
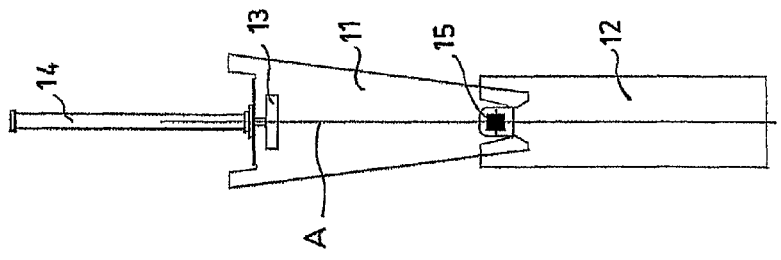
Figure 4:
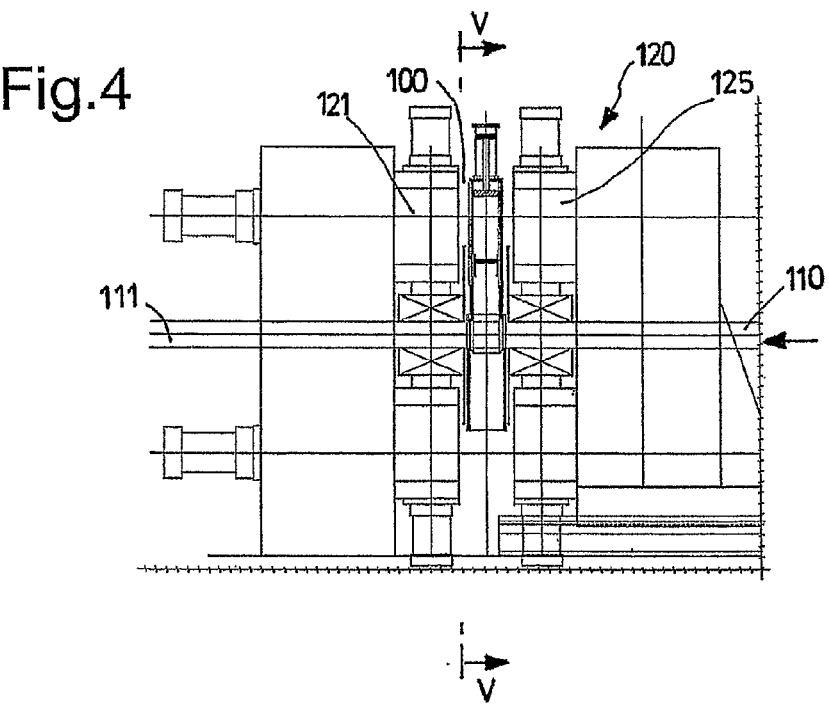
FIG. 4 is a schematic section view obtained along the extension direction of the rolling mill of a welding machine employing a weld splatter containment device according to the invention.
Figure 5:
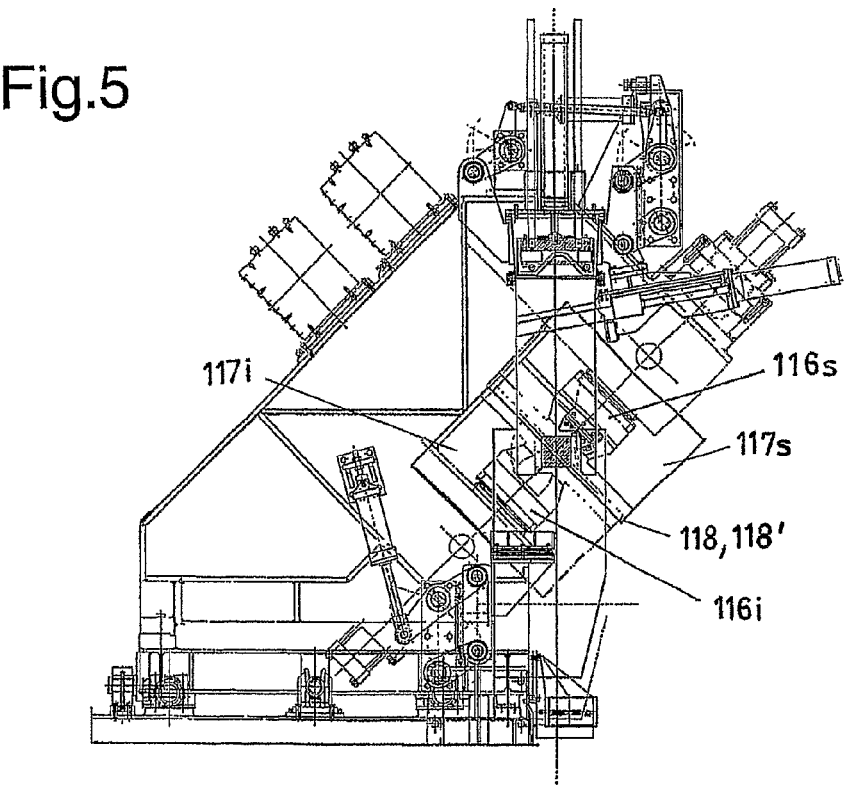
FIG. 5 is a view of the splatter containment device according to the invention and the welding machine with respect to the section obtained along the line V-V of FIG. 4.

With reference to the drawings, the splatter containment device for use in rolling mills, object of the present invention, is indicated with 100 overall, and in the illustrated example, according to the present invention, it comprises a movable lower cover 101, constrained in movement to a first actuator 102, and an upper movable cover 103, controlled in movement by a second actuator 104.

The upper cover 103 comprises a buffer 105 internally, connected to a first cylinder 106, and a guillotine shear 107, controlled by a second cylinder 108.

The first actuator 102, which in the illustrated embodiment is made by means of a lever system, allows the lower cover 101 to move away from and/or approach the welding zone, carrying out a respectively lowering and/or raising movement which follows a circular trajectory portion, indicated in the figure with B.

Analogously, the upper cover 103 is controlled in moving away from and/or approaching the welding zone by means of the second actuator 104, it too, in the illustrated embodiment, made by means of a lever system, which guides it respectively in a raising and/or lowering movement along a circular trajectory portion indicated in the figure with C.

In addition, both the first 102 and second 104 actuators have suitable adjustable end stops 109, 109' for adjusting the final position at the welding zone respectively of the lower cover 101 and the upper cover 103.

Due to the trajectory along the circumference portions B, C and to the adjustable end stops 109, 109' of the actuators 102, 104 which control the lower cover 101 and upper cover 103 in movement, such covers 101, 103 can be brought close to the billets 110, 111 until they substantially touch them.

The space between the billets 110, 111 and covers 101, 103 can thus be set to the desired value and therefore even be practically eliminated, so to ensure a complete enclosure of the weld splatter.

Figure 8:
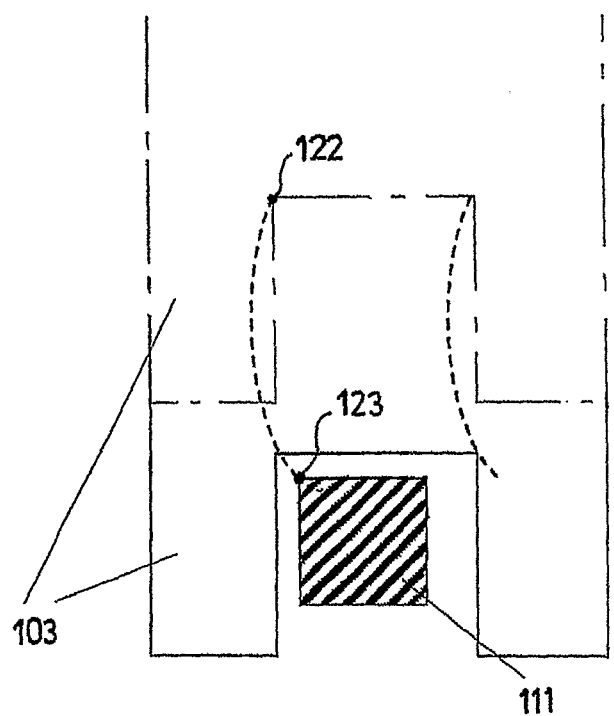
FIG. 8 is an enlarged detail of FIG. 7a in which the splatter containment device's approaching movement to the welding zone is illustrated.

With exemplifying reference to the upper cover as illustrated in FIG. 8, the circular trajectory in fact allows bringing the corner 122 of such cover 103 in contact with the upper corner 123 of the billet 111 engaged with the mill, practically eliminating the clearances between the two elements 103, 111, while the adjustable end stop 109 allows stopping the corner 122 in the desired position, achieving clearances of desired size.

Figure 6A:
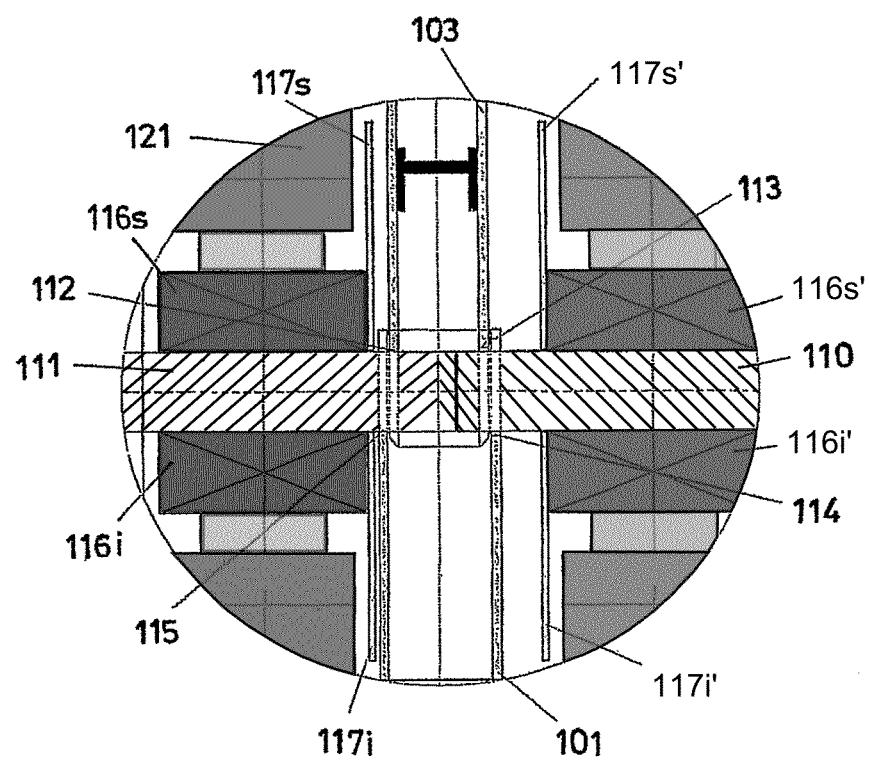
FIG. 6a is an enlarged detail of the welding machine and of the containment device shown in FIG. 4.
Figure 6B:
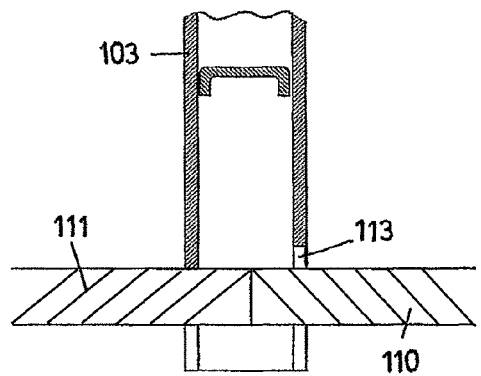

As shown in FIG. 6b, the particular shape of the upper cover 103 mounted on the fixed shoulder 121 of the welding machine 120 ensures that, if the end stop 109 relating to such upper cover 103 is adjusted so to bring the cover 103 in contact with the billet 111 engaged with the rolling mill, there would in any case be no contact between such upper cover 103 and the billet coming from the furnace 110, due to the presence of a clearance 113 between the billet 110 and the cover 103.

Figure 6C:
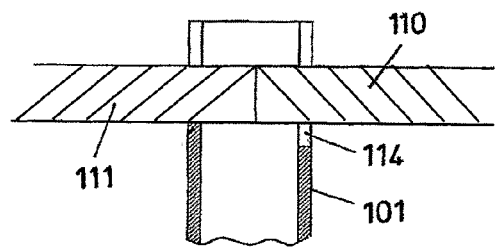
Figure 6D:
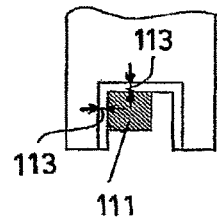
FIGS. 6d and 6e are side views illustrating the same details of the FIGS. 6b and 6c.
Figure 6E:
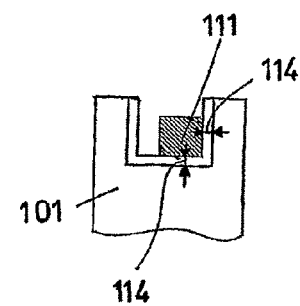

Analogously, FIG. 6c shows that if the end stop 109' relating to the lower cover 101 mounted on the fixed shoulder 121 of the welding machine 120 is adjusted, such to bring the cover 101 in contact with the billet 111 engaged with the rolling mill, such lower cover 101 does not in any case come to touch the billet 110 coming from the furnace, due to the presence of a clearance 114 between the billet 110 and the cover 101. Such characteristics are also illustrated in FIGS. 6d and 6e, which show a side view from the side of the movable shoulder 125 respectively of the upper 103 and lower 101 covers in contact with the billet 111 engaged with the rolling mill.

Thus it is ensured that the covers 101, 103, even if coming in contact, do not generate short circuits between the two billets 110, 111.

In order to obtain a further improvement of the weld splatter containment level, it is possible to provide for the use of four additional protections 117s, 117i, 117s', 117i' fixed on the electrode holders 116s, 116i, 116s', 116i', so to stop the weld splatter which can exit outward from the cracks between covers 101, 103 and billets 110, 111 adjusted by means of the end stops 109, 109'.

In particular, the protection pairs 117s, 117s', 117i, 117i' are made in a manner such to be superimposed for a surface portion 118, 118' when the holders 116s, 116l, 116s', 116i' grip the billets 110, 111, so to substantially close every weld splatter infiltration space.

In addition, inside the upper cover 103, the buffer 105 can be moved along the main extension of such cover 103, maintaining, over the entire extension, a suitable clearance between its peripheral side surface and the inner walls of the upper cover 103.

To such end, the upper cover 103 has a substantially equal section along the entire main extension thereof, complementary to the shape of the buffer 105.

Contrary to the known devices, the upper cover 103 of the device 100 according to the invention has walls at its part close to the welding zone which substantially lack tilting.

Hence, the buffer 105, during the descent phase, exerts a cleaning action over the entire surface of the cover 103, effectively removing the welding residues.

In addition, due to the particular shape of the upper cover 103, the end stop buffer can exit out from the same, in this manner being able to effectively clean the upper cover 103 over the entire zone most likely to accumulate welding residues.

Manual maintenance operations are therefore unnecessary, improving the continuity of the welding process.

The guillotine shear 107 can be inserted or extracted from the upper cover 103 in a manner such to form, when inserted, a protection of the buffer 105 during the flash phase.

In particular, it is defined that the guillotine shear 107 is "inserted" when the stem of the cylinder 108 is situated in completely extracted position with respect to the cylinder 108 itself. The guillotine shear 107 is instead "extracted" when the stem of the cylinder 108 is wholly inside the cylinder 108 itself.

The presence of the guillotine shear 107 prevents the weld splatter from reaching the buffer 105, maintaining its functionality unaltered over time.

The functioning of the weld splatter containment device according to the invention is as follows.

Figure 7A:
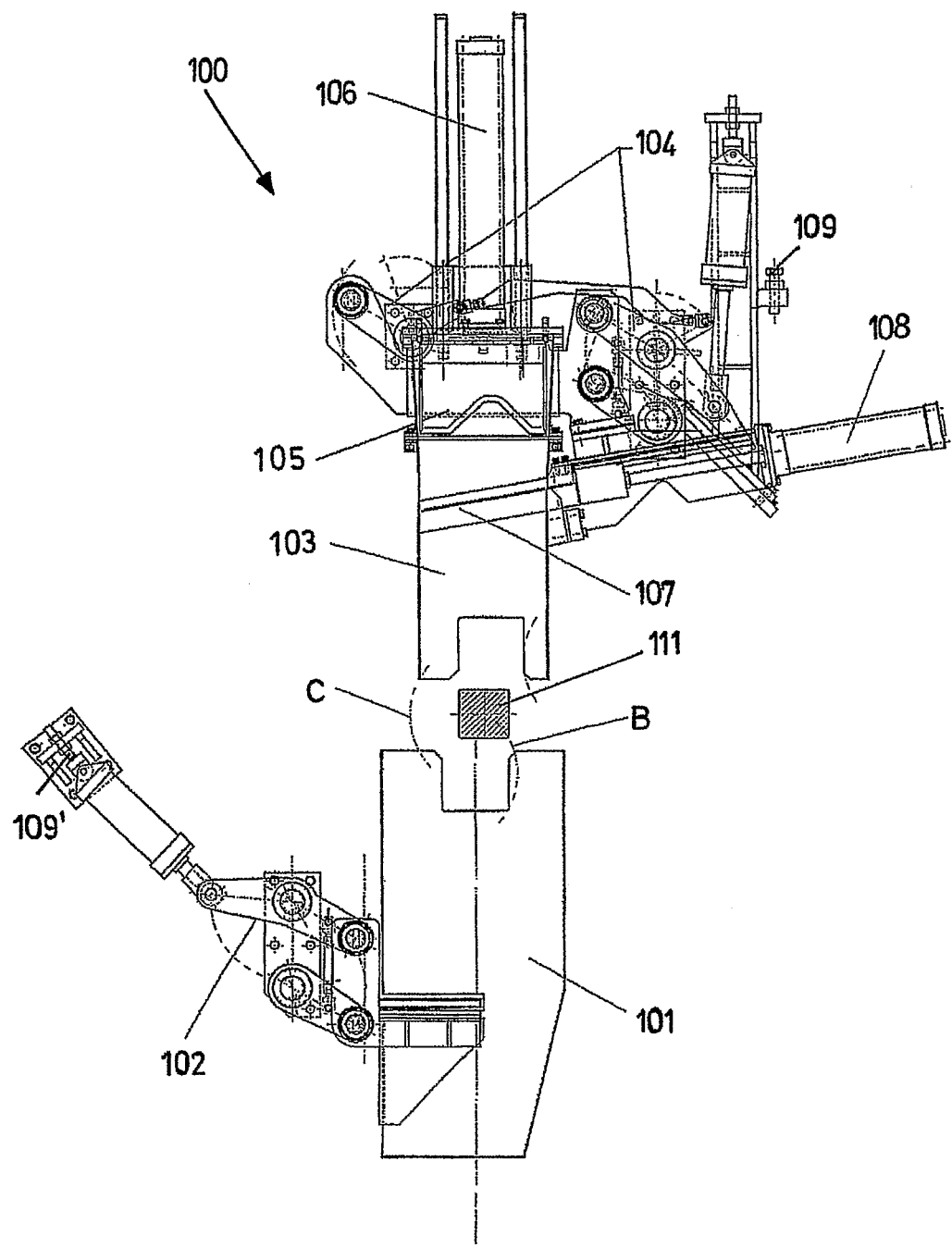

With every welding, the device assumes different operating configurations, according to the phase in which it is found, as illustrated in FIGS. 7a-7h. Initially, the device 100 has a configuration in which the lower 101 and upper 103 covers are situated in a position removed from the welding zone (FIG. 7a). Simultaneously, the buffer 105 is situated at the end of the upper cover 103, distal with respect to the welding zone, while the guillotine shear 107 is in "inserted" position.

After such initial phase, the upper 103 and lower 101 covers approach (FIG. 7b) the welding zone, until a closure position of such zone (FIG. 7c) is attained. Such position is maintained during the flash phase.

At the end of such phase, the upper 103 and lower 101 covers are once again brought into open position (FIG. 7d) and afterwards the guillotine shear 107 is cleaned of the welding residues by means of the extraction of the same from the upper cover 103 (FIG. 7e) and the consequent scraping against a suitable chisel provided at the cover 103 opening, through which the guillotine shear 107 slides.

The presence of the guillotine shear 107 ensures that the buffer 105 remains without welding residues.

The buffer 105 can therefore be employed for the subsequent cleaning of the upper cover 103, sliding along the inner walls of the same (FIG. 7f).

Afterwards, the buffer 105 returns to the distal position with respect to the welding zone (FIG. 7g) and the insertion of the guillotine shear 107 (FIG. 7h), once again reaching the starting configuration.

From that described above with reference to the figures, it is evident how a weld splatter containment device for use in rolling mills according to the invention is particularly useful and advantageous.

The object mentioned in the description introduction is thus attained.

Invention embodiments can be different from those shown only as a non-limiting example in the drawings, as the materials used can also be different.

The protective scope of the invention is therefore delimited by the attached claims.

The invention claimed is:

1. A weld splatter containment device for use in rolling mills, comprising:
    a lower cover and an upper cover, each movably mounted and controlled for approaching towards and moving away from a welding zone; and
    first and second actuators disposed to move said lower and upper covers respectively, and wherein at least one of said first and second actuators includes an adjustable end stop configured for setting a maximum closed position of said lower cover or said upper cover;
    wherein said lower cover and said upper cover surround the welding zone when said lower cover and said upper cover are disposed in a position close to the welding zone;
    wherein said lower cover and said upper cover are each configured to at least partially cover each one of two billets to be welded together in the welding zone when said lower cover and said upper cover are disposed in the position close to the welding zone; and
    wherein said lower cover is controlled to approach towards and move away from the welding zone along a first circular trajectory portion and said upper cover is controlled to approach towards and move away from the welding zone along a second circular trajectory portion.

2. The device according to claim 1, wherein said upper cover is shaped to only come into contact with a first element to be welded, leaving a clearance with a second element to be welded, when arranged in the position close to the welding zone.

3. The device according to claim 1, wherein said lower cover is shaped to only come into contact with a first element to be welded, leaving a clearance with a second element to be welded, when arranged in the position close to the welding zone.

4. The device according to claim 1, wherein said lower cover is controlled in movement by means of said first actuator.

5. The device according to claim 4, wherein said first actuator is a lever system.

6. The device according to claim 1, wherein said upper cover is controlled in movement by means of said second actuator.

7. The device according to claim 6, wherein said second actuator is a lever system.

8. The device according to claim 1, wherein said upper cover is shaped to have a uniform section along an entire main extent thereof.

9. The device according to claim 8, wherein said upper cover is hollow and internally comprises a buffer controlled by way of a third actuator, said buffer having complementary dimensions to said section of said upper cover and being slidable inside said upper cover along a main extent of said upper cover between a first rest position, distal from the welding zone, and a second position at an end of said upper cover close to the welding zone.

10. The device according to claim 9, wherein said upper cover comprises a guillotine shear controlled by means of a fourth actuator, said guillotine shear being slidable through an opening of said upper cover along a direction transverse to a main extension direction of said upper cover, to assume a first operating position completely inside said upper cover and a second cleaning position completely outside said upper cover.

11. The device according to claim 10, wherein said guillotine shear, in the first operating position inside said upper cover, is placed at a position that is closer to said end of said upper cover than said first rest position which said buffer can assume.

12. A welding machine for use in a rolling mill, comprising:
    a fixed structure having a first pair of electrode holders adapted to clasp a first element;
    a moveable structure having a second pair of electrode holders adapted to clasp a second element to be welded to the first element; and
    a weld splatter containment device according to claim 1 disposed relative to said fixed and movable structures.

13. The welding machine according to claim 12, which comprises at least one protection mounted on at least one electrode holder selected from the group consisting of said first pair of electrode holders and said second pair of electrode holders.

14. The welding machine according to claim 13, wherein said at least one protection comprises at least one upper protection portion and at least one lower protection portion, said upper and lower protection portions being shaped to be partially superimposed when said first pair of electrode holders and said second pair of electrode holders are in a clasping configuration.

\* \* \* \* \*